June 1, 1943.　　　R. C. HOWELL　　　2,320,600
INDUSTRIAL TRUCK
Filed Sept. 5, 1942　　　4 Sheets-Sheet 1

INVENTOR
*Roy C. Howell*
BY *Frank S. Greene*
ATTORNEY

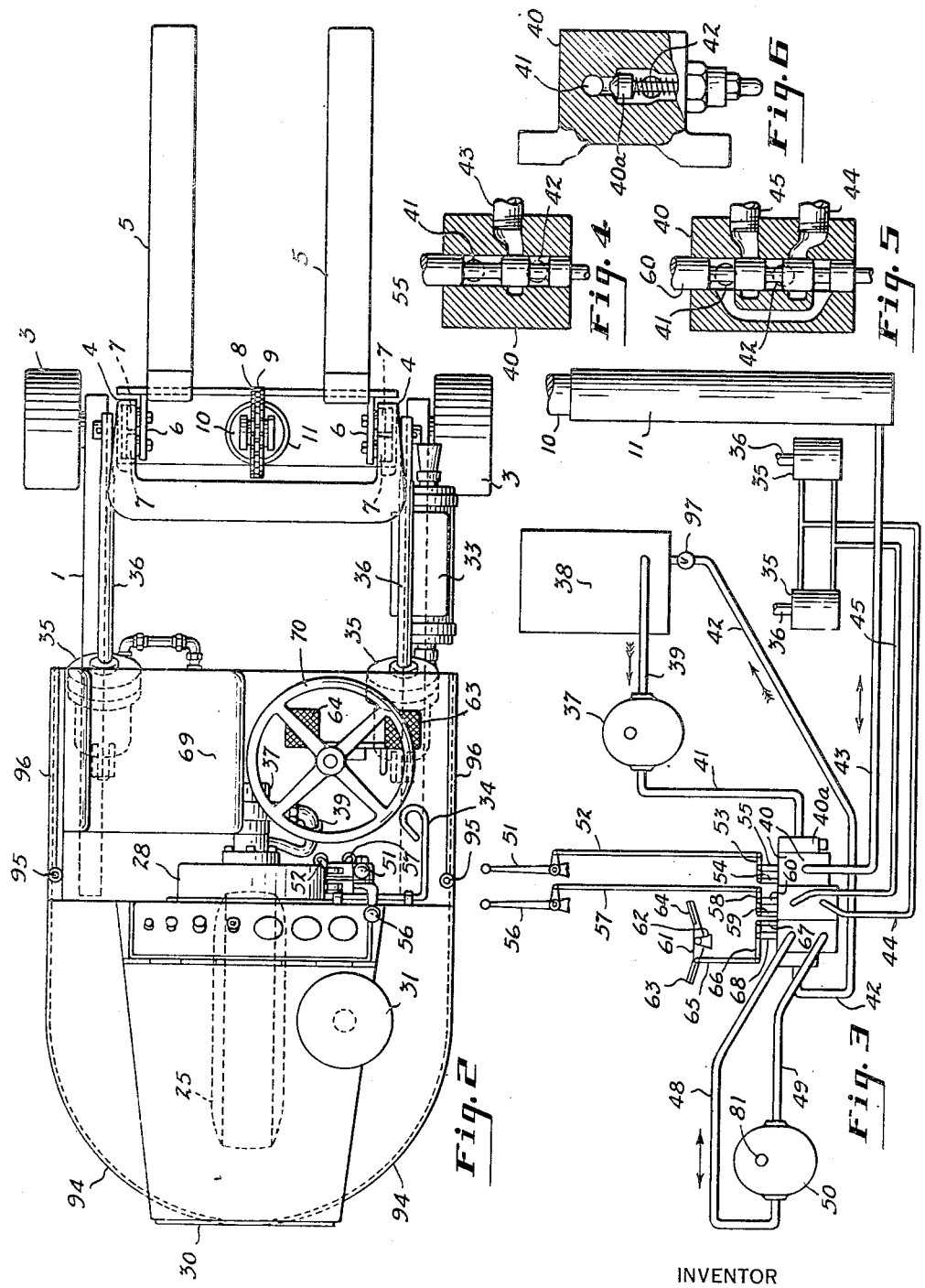

INVENTOR
Roy C. Howell
BY Frank S. Greene
ATTORNEY

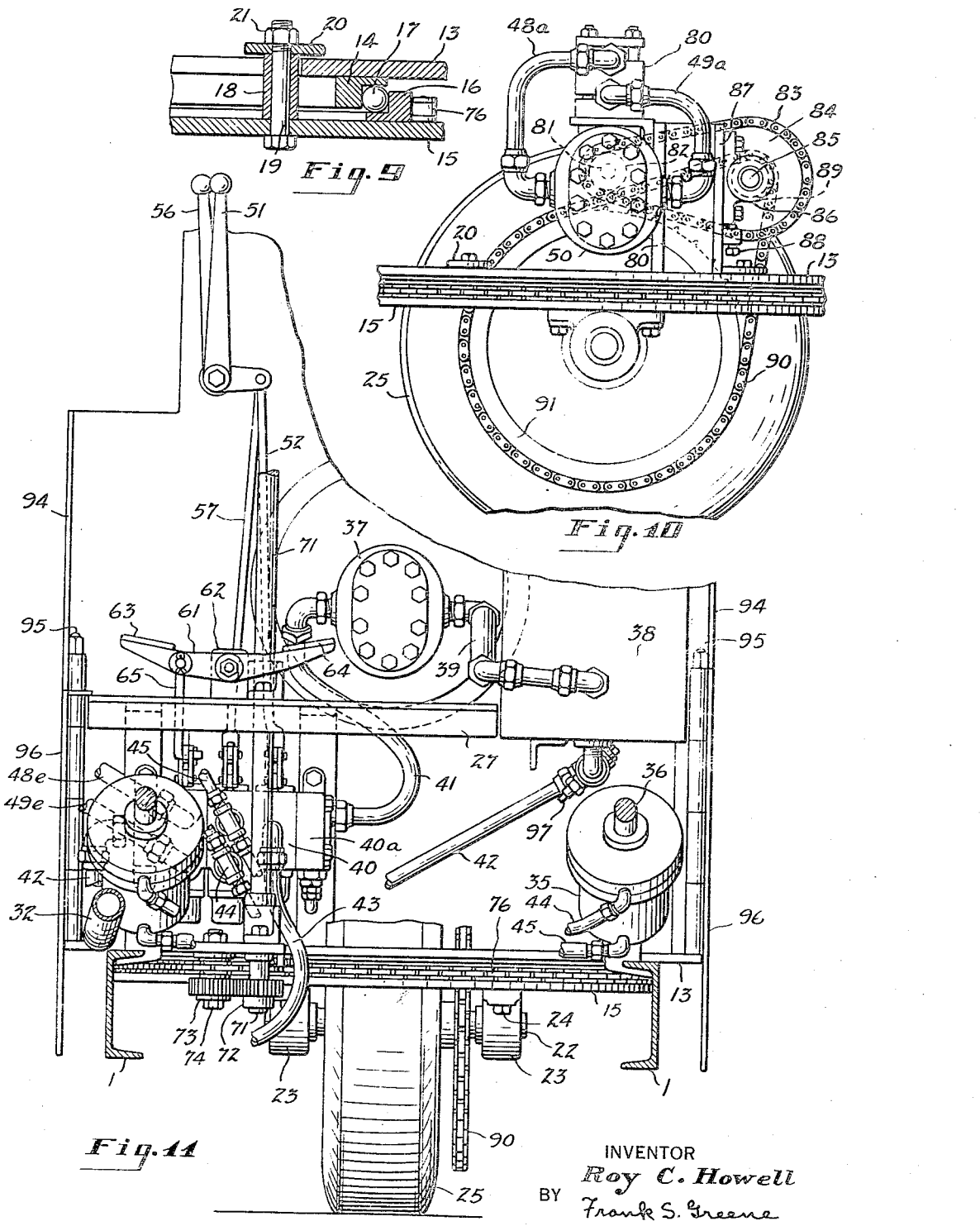

Patented June 1, 1943

2,320,600

UNITED STATES PATENT OFFICE 2,320,600

INDUSTRIAL TRUCK

Roy C. Howell, Lakewood, Ohio

Application September 5, 1942, Serial No. 457,460

5 Claims. (Cl. 214—113)

This invention relates to industrial trucks, and more particularly to trucks of the type having a load lifting and carrying member at its forward end and provided with hoisting and propelling mechanisms.

It is an object of the present invention to provide a truck of the character referred to which is driven through a swiveled rear supporting wheel.

A further object is to provide a truck in which a motor platform is fixed to the truck frame and overlies a swiveled wheel and in which a reversible driving connection is provided from a motor on the platform to the swiveled wheel.

A further object is to provide a swiveled wheel frame carrying a fluid motor and fluid pressure connections for the motor, including a pump and control valves on the truck frame, and flexible tubing for supplying fluid under pressure to the fluid motor.

A further object is to provide an improved power system for industrial trucks which includes valve controlled fluid pressure operated propelling and hoisting mechanisms operated by fluid delivered thereto from a single power driven pump.

With the above and other objects in view the invention may be said to comprise the truck as illustrated in the accompanying drawings hereinafter described and particularly set forth in the appended claims, together with such variations and modifications thereof as will be apparent to one skilled in the art to which the invention pertains.

Reference should be had to the accompanying drawings forming a part of this specification, in which:

Fig. 2 is a top plan view of the truck;

Fig. 3 is a hydraulic diagram showing the operating connections for the hoist cylinders and propelling motor;

Fig. 4 is a fragmentary section showing the single action control valve;

Fig. 5 is a fragmentary section showing one of the double actions control valves;

Fig. 6 is a fragmentary section showing the safety valve associated with the control valves;

Fig. 9 is a section taken on the line indicated at 9—9 in Fig. 7;

Fig. 10 is a fragmentary side elevation of the swiveled wheel and its driving mechanism; and Fig. 11 is a section taken on the line indicated at 11—11 in Fig. 1.

Figure 1:
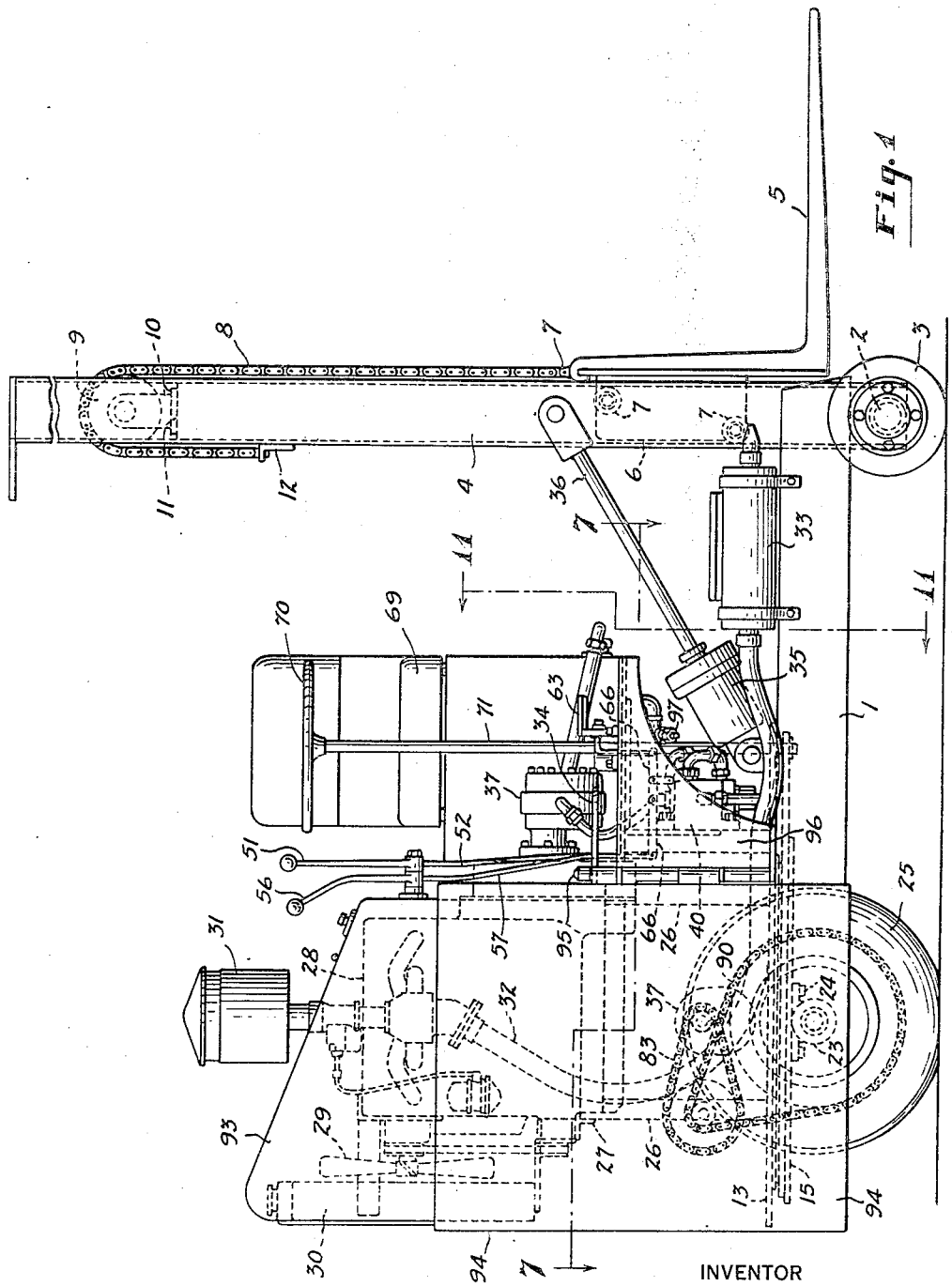
Figure 1 is a side elevation of a truck embodying the invention.

Referring to the accompanying drawings, the truck of the present invention has side frame members 1 of channel form, a front axle 2, carrying wheels 3 at opposite ends thereof, and hoist standard composed of oppositely facing channel guide columns 4 supported on the axle between the side frame members 1. A lift platform 5 has a carriage 6 provided with wheels 7 guided in the channels of the guide columns 4. A sprocket chain 8 is connected at one end to the carriage 6 and extends over a sprocket 9 on the upper end of a piston 10 which projects from a vertical cylinder 11 mounted centrally of the standard between the columns 4, and at its opposite end is anchored to a horizontal cross bar 12 attached to the columns 4 so that when the piston 10 and sprocket 9 are moved upwardly the carriage 6 and platform 5 are caused to travel upwardly on the standard.

A horizontal annulus 13 is rigidly attached to the rear ends of side members 1 and forms a cross member at the rear end of the frame. The annulus 13 carries a race ring 14 of angle shape in cross section on its underside and is supported by an annular wheel frame 15 which has an angle shaped race ring 16 which underlies the ring 14 to provide a raceway for bearing balls 17. The frame 15 carries a series of tubular positioning posts 18 at spaced points about the interior of the annulus 13 which are clamped by bolts 19. Each bolt 19 extends lengthwise through a tubular post 18 and through a washer 20 resting upon the upper end of the post and overlapping the inner margin of the annulus 13, the washer 20 and post 18 being clamped by a nut 21 on the upper end of the bolt 19. The swiveling frame 15 supports an axle 22 which is supported in horizontally aligned bearing members 23 attached by bolts 24 to the underside of the frame 15. The wheel 25, which is preferably a pneumatic tired wheel, is mounted on the axle 22. The axle 22 is disposed centrally of the swiveling frame 15 and extends across the vertical axis thereof and the wheel 25 is disposed centrally of the axle and projects through the aperture of the bearing annulus. Adjacent the rear end of the truck frame, posts 26 are rigidly attached to the side frame members 1 and suitable cross members attached to the posts form a raised platform 27 directly over the swiveled supporting wheel. A suitable motor such as an internal engine 28 is rigidly attached to the support or platform 27, the engine shown being of conventional design having a fan 29, a radiator 30, an air filter 31, an exhaust pipe 32, and a muffler 33 which is positioned adjacent the lower end of the standard. The engine may also be provided with an accelerator pedal 34 which serves to increase the supply of fuel to the engine.

The standard 4 is pivotally mounted on the axle 2 and is held in a vertical or a tilted position by means of cylinders 35 pivoted to the side frame members 1 and pistons 36 which are pivoted to the standard. When the pistons 36 are in extended position, the standard is held in vertical position. When the pistons 36 are retracted, the standard is tilted rearwardly at a small angle so that the load carrying platform 5 is inclined rearwardly to more securely hold its load.

The truck of the present invention is propelled by means of an hydraulic transmission or power system which is operated by the engine 28. The hydraulic power system employed is illustrated diagrammatically in Fig. 3 of the drawings. A pump 37 is driven by the engine 28 and draws liquid from the reservoir through a pipe 39 and delivers liquid to a valve unit 40 through a pressure pipe line 41. The valve unit 40 is a conventional hydraulic power control unit of the tandem multiple control valve type which maintains a predetermined difference in pressure between a pressure line and a return line and which has suitable valves to control the connection of hydraulically operated devices to the pressure and return lines. The unit 40 has a safety valve 40a which controls the flow of liquid from the pipe 41 through the unit to an exhaust or return pipe line 42 which extends to the reservoir 38 and maintains a predetermined pressure in the line 41 while the pump is operating. The lower end of the hoist cylinder 11 is connected to the valve unit 40 by a pipe 43. The tilting cylinders 34 are connected to the valve unit 40 through pipes 44 and 45, the pipe 44 extending to the upper ends of the cylinders and the pipe 45 to the lower ends thereof. Pipes 48 and 49 connect the valve unit 40 with a hydraulic motor 50 which drives the wheel 25 through driving connections which will be hereinafter described. Delivery of liquid under pressure from the valve unit 40 to the cylinder 11 is controlled by a lever 51 which is connected by a link 52 to a lever 53 which is pivoted to a post 54 mounted on the valve unit and which is attached to the upper end of a valve 55. The valve 55 is a single action valve movable from a position in which its establishes communication between the pipe 43 and the pressure line 41 to a position in which it establishes communication between the pipe 43 and the return line 42, the valve 55 preferably having an intermediate position, as shown in Fig. 4, in which the pipe 43 is closed to retain liquid in the cylinder 11. The tilting cylinders 35 are controlled by a lever 56 which is connected by a link 57 with a lever 58 pivoted to a post 59 on the unit 40 and connected to a vertical movable valve 60 which is movable in either direction from a neutral position, closing both lines 44 and 45, as shown in Fig. 5, to connect the line 45 to the pressure line 41, and the line 44 to the return line 42, or to connect the line 45 to the return line 42 and the line 44 to the return pipe 42, to lower the pistons 36 and tilt the standard or to extend the pistons 36 and move the standard 4 to a vertical position.

The delivery of fluid under pressure to the motor 50 is controlled by a lever 61 which is centrally pivoted upon a fixed bracket 62 and which has a toe plate 63 and a heel plate 64 whereby an operator with his foot on the pedal may impart the desired amount of movement in either direction to the lever. The lever 61 is connected by a link 65 to the lever 66 pivoted on a post 67 attached to the unit 40 and connected to the upper end of vertically movable double action valve 68, which may be identical with the valve 60. In the horizontal position of the lever 61 the valve 68 is in a neutral position, entirely cutting off both the pipe 48 and the pipe 49. Upon movement of the valve 68 in one direction from its neutral position, the pipe 48 is connected to the pressure line 41 and the pipe 49 is connected to the return line 52. Upon movement of the valve 68 in the opposite direction from its neutral position, the pipe 49 is connected to the pressure line 41 and the pipe 48 is connected to the return line 42, reversing the flow of fluid through the motor 50. The pedal lever 61 serves to control the direction of rotation of the motor 50 and to regulate the speed of rotation, the movement of the slidable valve 68 being such as to gradually open and close the ports and thereby regulate the rate of flow of liquid.

Forwardly of the platform 27 and between the platform 27 and the standard 6 a laterally facing operator's seat 69 is provided and immediately in front of the operator's seat is a steering wheel 70 on the upper end of a steering column 71. The column 71 has a gear 72 at its lower end which meshes with a gear 73 on a short vertical countershaft 74 which is located centrally of the truck frame forwardly of the swiveling wheel frame 15. The shaft 74 carries a sprocket 75 which meshes with a sprocket chain 76 which extends around the race ring 16 on the wheel frame 15 and has its ends attached together and to the wheel frame at 77, the point of attachment being substantially diametrically opposite the shaft 74, so that the swiveled wheel support may be swung through nearly a half turn in either direction from the position in which the axle 22 is at right angles to the longitudinal axis of the truck. The hydraulic motor 50 is mounted on a standard 80 rigidly attached to the wheel frame 15 and the motor 50 has a shaft 81 carrying a sprocket 82 which drives a sprocket chain 83 running over a sprocket 84 on a horizontal shaft 85 carried by supporting brackets 86 which are mounted for vertical adjustment on standards 87 on the wheel frame 15, the brackets 86 being held in adjusted position by means of adjusting screws 88. The shaft 85 carries a second sprocket 89 which drives a sprocket chain 90 extending over a large sprocket 91 on the wheel 25. The motor 50 thus has a direct driving connection to the wheel 25 and is mounted in a relatively fixed position with respect to the wheel axis.

Figure 7:
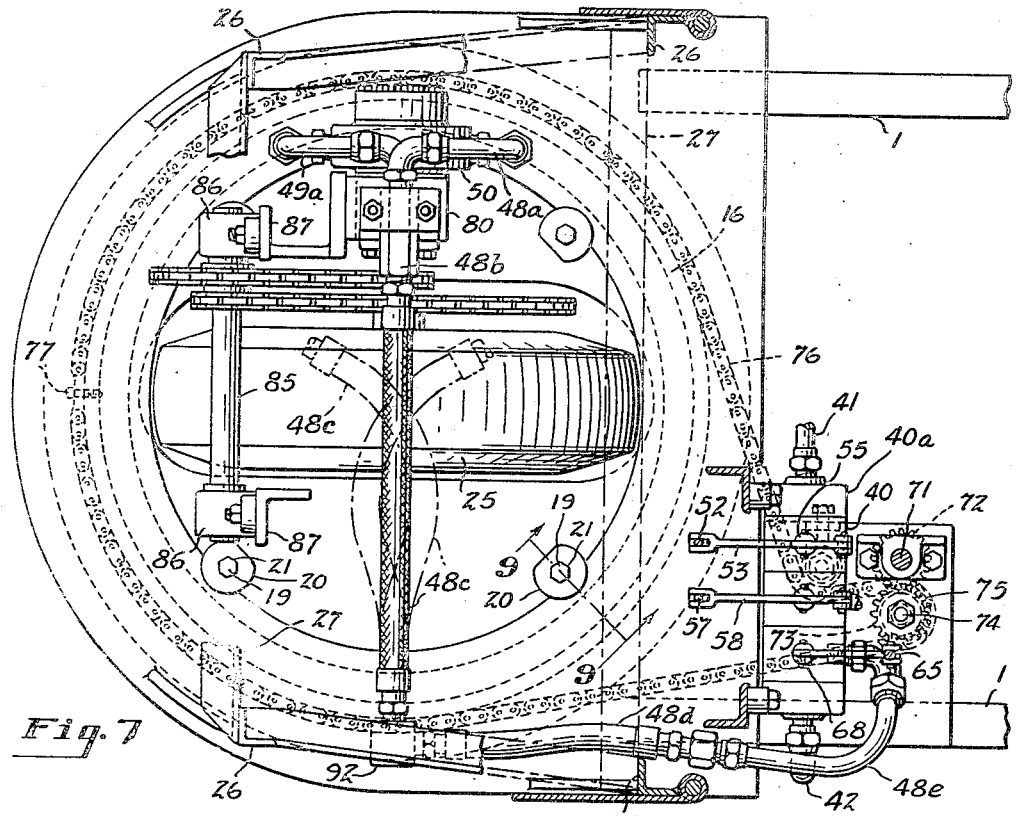
Fig. 7 is a horizontal section taken on the line indicated at 7—7 in Fig. 1.
Figure 8:
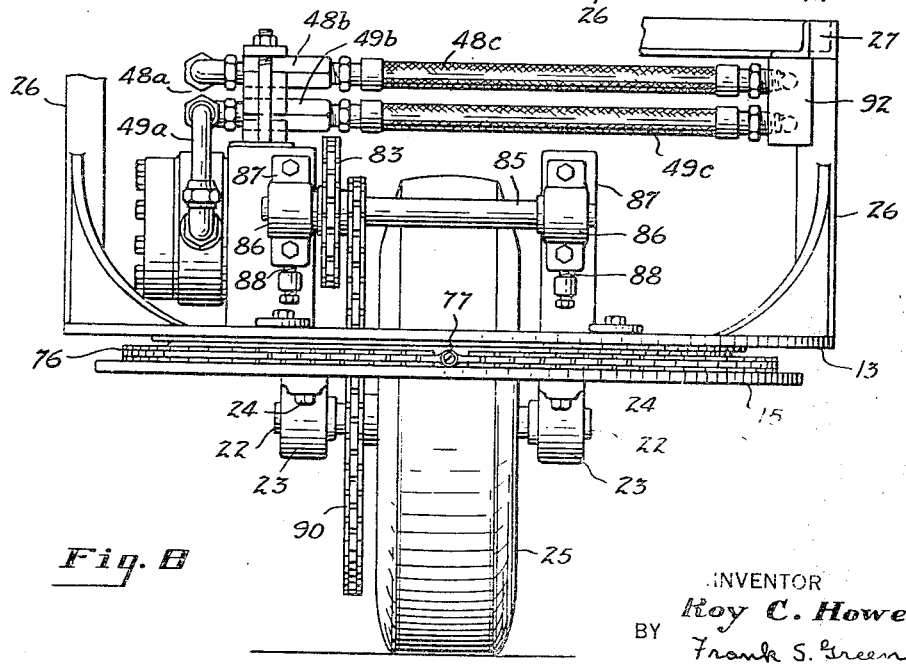
Fig. 8 is a fragmentary rear elevation of the swiveled wheel and its driving mechanism.

Since the motor 50 is mounted on a swiveled frame and the valve unit 40 is mounted upon the truck frame, it is necessary to provide suitable flexible pipe sections in the lines 48 and 49. As best shown in Figs. 7 and 8 of the drawings, pipe sections 48a and 49a are connected to the motor 50 at diametrically opposite points and are connected to superposed horizontal sections 48b and 49b which are rigidly secured to the standard 80. Flexible hose sections 48c and 49c are connected to the sections 48b and 49b and extend diametrically across the annular tractor frame above the wheel to a fitting 92 fixed to the underside of the platform 27. The flexible pipe sections 48c and 49c are substantially straight and parallel with the axle 22 when the axle is disposed at right angles to the longitudinal axis of the truck. As the wheel frame is turned in either direction from this position, the standard 80 is moved closer to the fitting 91 and the flexible pipe sections 48c and 49c will be bowed as much as is necessary to accommodate the movement of the standard 80 toward the fitting 92. The fitting 92 is provided with separate passages communicating with the pipe sections 48c and 49c and the passages are connected by suitable pipes to the valve unit 40. As shown in Fig. 7, the pipes leading from the fitting 91 to the valve unit 40 may include a flexible section such as the section indicated at 48d and a metallic pipe section such as the section indicated at 48e.

The upper portion of the engine 28 is enclosed within a fixed housing 93, while the lower portion of the engine 28 and the motor supporting wheel frame are enclosed by curved housing sections 94 which are jointed edge to edge at the rear end of the truck and which are pivoted at their forward ends on vertical pintles 95 secured to the truck frame. Rearwardly extending plates 96 are also supported on the pintles 95 and provide guards for the pump 37 and valve unit 40.

The return line 42 may be provided with a closure valve 97 adjacent the bottom of the reservoir 38 so that gravity flow of liquid from the reservoir may be prevented when parts of the system are being overhauled.

In the operation of the truck the operator seated on the seat 69 starts the engine 28, after which operation of the pump 37 will establish the operating pressure in the line 41. By rocking the pedal lever 61 with one foot the operator may cause the wheel 25 to be driven by the motor 50 in either direction, regulating the speed by the position of the foot in engagement with the pedal. Braking action may be instantly obtained at any time by rocking the pedal lever 61 toward horizontal position. With a laterally facing seat such as shown, the operator can see equally well forwardly or rearwardly. The hand levers 51 and 56 for controlling the hoist and tilting cylinders are positioned alongside the steering wheel within convenient reach of the operator. The normal position of the pedal lever 61 is the horizontal neutral position so that if the operator's foot should be accidentally dislodged from the control pedal, the return of the control valve to neutral position would apply the brake. This automatic braking action is a desirable safety feature.

What I claim is:

1. An industrial truck comprising a frame, wheels supporting the forward end of the frame, a load carrying member mounted for vertical movement at the forward end of the frame, a horizontal bearing annulus forming the rear cross member of the frame, a wheel frame having an annulus beneath and rotatably engaging said bearing annulus, an axle mounted on the wheel frame and extending across the axis of the annulus, a wheel on said axle, means for turning said wheel frame to steer the truck, a fluid motor on said wheel frame geared to said wheel, reversible fluid connections for said motor including pipes on said truck frame, flexible hose connections from said pipes to said motor, pressure and return lines adapted to be connected to said pipes, a pump on the truck frame for maintaining pressure in the pressure line, an engine on the truck frame for driving said pump, and means for controlling the direction of flow of fluid through said motor.

2. An industrial truck comprising a frame, wheels supporting the forward end of the frame, a load carrying member mounted for vertical movement at the forward end of the frame, a horizontal bearing annulus forming the rear cross member of the frame, a wheel frame having an annulus beneath and rotatably engaging said bearing annulus, an axle mounted on the wheel frame and extending across the axis of the annulus, a wheel on said axle, means for turning said wheel frame to steer the truck, a fluid motor mounted on said wheel frame, a pair of pipes connected to said motor and having end portions directly over the axle and parallel therewith, pipes on the truck frame at the side thereof opposite that on which the motor is mounted, flexible pipe sections connecting the pipes on the wheel and truck frames and extending across the wheel frame over said wheel, pressure and return lines adapted to be connected to said pipes, a pump on the truck frame for maintaining pressure in the pressure line, an engine on the truck frame for driving said pump, and means for controlling the direction and rate of flow of fluid through said motor.

3. An industrial truck comprising a frame, wheels supporting the forward end of the frame, a load carrying member mounted for vertical movement at the forward end of the frame, a horizontal bearing annulus forming the rear cross member of the frame, a wheel frame having an annulus beneath and rotatably engaging said bearing annulus, an axle mounted on the wheel frame and extending across the axis of the annulus, a wheel on said axle, means for turning said wheel frame to steer the truck, a fluid motor mounted on said wheel frame, a pair of pipes connected to said motor and having end portions directly over the axle and parallel therewith, pipes on the truck frame at the side thereof opposite that on which the motor is mounted, flexible pipe sections connecting the pipes on the wheel and truck frames and extending across the wheel frame over said wheel, said flexible pipe sections being substantially straight and parallel with said axle when the axle is at right angles to the longitudinal axis of the truck frame, pressure and return lines adapted to be connected to said pipes, a pump on the truck frame for maintaining pressure in the pressure line, an engine on the truck frame for driving said pump, and means for controlling the direction and rate of flow of fluid through said motor.

4. An industrial truck comprising a frame, wheels supporting the forward end of the frame, a wheel supporting the rear end of the frame, a vertically movable load carrying member at the front end of the truck, means for turning said rear wheel about a vertical axis to steer the truck, a hydraulic motor geared to said rear wheel, a liquid reservoir, a valve unit, a pressure line, and a return line connecting the reservoir with said unit, pipes connecting said valve unit with said motor, a valve movable in either direction from a neutral position to connect said motor with said pressure and return lines to drive said motor in either direction, a pedal lever fulcrumed intermediate its ends connected to said valve, said lever having a toe plate and a heel plate on opposite sides of said fulcrum whereby said lever may be rocked in either direction to drive said motor in either direction and to regulate the speed of said motor, a pump for maintaining pressure in the pressure line, and a motor for driving said pump.

5. An industrial truck comprising a frame, wheels supporting the forward end of the frame, a wheel supporting the rear end of the frame, a vertically movable load carrying member at the front end of the truck, means for turning said rear wheel about a vertical axis to steer the truck, a hydraulic motor geared to said rear wheel, a liquid reservoir, a valve unit, a pressure line, and a return line connecting the reservoir with said unit, pipes connecting said valve unit with said motor, a valve movable in either direction from a neutral position to connect said motor with said pressure and return lines to drive said motor in either direction and to restrict the passages connecting said pipes to said pressure and return lines to regulate the speed of said motor, an actuating member connected to said valve, a pump on said frame for maintaining pressure in the pressure line, and a motor on said frame for driving said pump.

ROY C. HOWELL.